United States Patent [19]

Degenhardt

[11] 4,318,001
[45] Mar. 2, 1982

[54] LUMINESCENT MATERIALS WITH INCREASED HUMIDITY STABILITY

[75] Inventor: Heinz Degenhardt, Erlangen, Fed. Rep. of Germany

[73] Assignee: Siemens Aktiengesellschaft, Berlin & Munich, Fed. Rep. of Germany

[21] Appl. No.: 150,600

[22] Filed: May 16, 1980

[30] Foreign Application Priority Data

Jul. 6, 1979 [DE] Fed. Rep. of Germany ....... 2927428

[51] Int. Cl.³ ..................... G01N 21/64; C09K 11/24; C09K 11/46
[52] U.S. Cl. .............................. 250/483; 252/301.45; 252/301.4 H
[58] Field of Search .............................. 250/483, 486; 252/301.4 H, 301.4 S, 301.4 R

[56] References Cited

U.S. PATENT DOCUMENTS 4,105,909 8/1978 Ignasiak .............................. 313/473

4,180,740 12/1979 Suys et al. .......................... 250/483

FOREIGN PATENT DOCUMENTS 2815679 10/1978 Fed. Rep. of Germany.

Primary Examiner—F. Edmundson
Attorney, Agent, or Firm—Hill, Van Santen, Steadman, Chiara & Simpson

[57] ABSTRACT

Luminescent crystals of the activated rare-earth oxybromide type are coated with a layer of a double salt metal lanthanum sulfate, such as aluminum-lanthanum sulfate or an alkali-lanthanum sulfate, so as to stabilize the resultant luminescent material against humidity without adversely effecting the luminescence capability of such material. The humidity-stabilized luminescent materials of the invention are useful in luminescent coatings or the like employed in medical x-ray diagnoses for intensification of radiation effects on radiographic exposure films. Such intensification coatings generally are incorporated within x-ray intensifier foils.

3 Claims, 3 Drawing Figures

LUMINESCENT MATERIALS WITH INCREASED HUMIDITY STABILITY

BACKGROUND OF THE INVENTION

1. Field of the Invention:

The invention relates to luminescent materials and somewhat more particularly to humidify-stabilized crystals of the activated rare-earth oxybromide type.

2. Prior Art:

Luminescent materials of the activated rare-earth oxybromide type are known, for example see German Offenlegungsschrift (hereinafter DT-OS) No. 28 15 679. Such oxybromide luminescent materials are typically very stable under dry storage conditions. However, they decompose very rapidly under humid conditions. Even when, for example, rare-earth activated lanthanum oxybromide materials are compressed into tablets, they disintegrate in a few days at ambient humidity typically present at room temperatures.

Heretofore, attempts have been made to stabilize luminescent materials against humidity in various ways. One such method is described in the above-referenced DT-OS. In this process, the sensitivity of the lanthanum oxybromide to moisture is reduced by converting the surface of the LaOBr-crystals into oxyfluoride or oxychloride. Crystals are thus obtained which have a chloride or fluoride outer coating which protects against decomposition that may be caused by atmospheric humidity. However, a disadvantage of this type of stabilization is that the halide coating causes a perceptible loss of luminescence, which can amount up to 10% to 30%, relative to identical uncoated or non-stabilized luminescent material. Further, due to a change of halides, traps or absorbance centers in the luminescent materials are produced which render such materials more sluggish in light-decay, ie., the luminescence persistence or afterglow is increased by up to 100%. Yet further, the exchange of halides which occurs at the edge or boundaries of the so-stabilized crystals can only be reproduced with difficulty, particularly because such halide coatings are achieved with a treatment by gaseous HCl of HF.

SUMMARY OF THE INVENTION

The invention provides a luminescent material selected from the group of activated rare-earth oxybromides which are reproducibly stabilized against humidity without impairing the luminescence characteristics thereof.

In accordance with the principles of the invention, rare-earth activated oxybromide luminescent materials are coated with a layer of a double salt selected from the group consisting of:

$$M^{I}La(SO_4)_2; \ M^{I}_3La(SO_4)_3; \ \text{and} \ M^{III}La(SO_4)_3$$

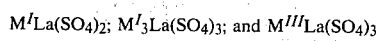

wherein $M^I$ is an alkali metal, preferably sodium, and $M^{III}$ is an earth metal, preferably aluminum.

The humidity-stabilized luminescent materials of the invention are produced in accordance with the principles of the invention by treating luminescent crystals of the general formula:

LnOBr:Act

wherein Ln is a lanthanide and Act is an activator, with a weakly acidic, aqueous solution which contains an effective amount of dissolved $M^I$ or $M^{III}$ sulfate, such as sodium hydrogen sulfate, aluminum sulfate, ammonium aluminum sulfate, or mixtures thereof.

In preferred embodiments of the invention, a coating of $NaLa(SO_4)_2$ is obtained by dissolving about 3 to 5% by weight of sodium hydrogen sulfate in an aqueous, weakly acidified (pH less than about 5) solution, whereas a coating of $Na_3La(SO_4)_3$ is obtained by treating select luminescent crystals with an aqueous, weakly acidified solution containing about 30 to 50% by weight of dissolved sodium hydrogen sulfate therein and a coating consisting of $AlLa(SO_4)_3$ is obtained by treating select luminescent materials with an aqueous, weakly acidified solution containing about 3 to 5% by weight of dissolved aluminum sulfate or ammonium aluminum sulfate or mixtures thereof.

Humidity-stabilized luminescent materials of the invention are useful, for example, in a luminescent coating of an x-ray intensifier foil.

DESCRIPTION OF THE PREFERRED EMBODIMENTS

Figure 1:
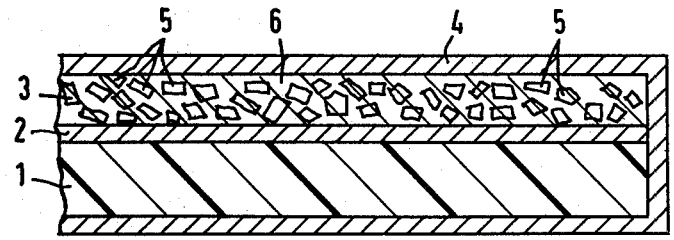
FIG. 1 is an elevated, cross-sectional and partial view of an x-ray intensifier foil having a luminescent coating containing humidity-stabilized luminescent materials produced in accordance with the principles of the invention.

The invention provides humidity-stabilized luminescent materials, methods of producing such materials and structures incorporating such materials therein.

In accordance with the principles of the invention, luminescent material crystals, such as lanthanum oxybromide crystals, are coated with a layer composed of a double salt selected from the group consisting of alkali-metal-lanthanum sulfates and earth metal-lanthanum sulfates. The so-coated crystals are completely stable in the presence of water and atmospheric humidity without exhibiting any detriment effects, such as loss of luminescence activity or an increase in afterglow characteristics. The stabilized luminescent materials of the invention exhibit a durability similar to that of calcium tungstate, which, as is known, is extremely stable. The stabilized layer or envelope which surrounds a luminescent material crystal is, in general terms, composed predominantly of compositions having the following general formulas:

$$M^{I}La(SO_4)_2 \text{ or } M^{I}_3La(SO_4)_3 \text{ or } M^{III}La(SO_4)_3$$

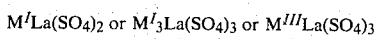

wherein $M^I$ is an alkali-metal, preferably sodium and $M^{III}$ is an earth metal, preferably aluminum.

In accordance with the principles of the invention, luminescent crystals of the activated rare-earth oxybromide type, for example comprised of (La, Pb, Na) O Br:Tb:Eu are coated with a double salt metal-lanthanum sulfate by admixing such luminescent material crystals with an aqueous solution which is weakly acidified, for example, with sulfuric acid, to a pH of less than about 5 (approximately 1/10 to 1/1000 N $H_2SO_4$) and contains an effective amount of a dissolved alkalisulfate, an earth metal sulfate or mixtures thereof and precipitating a coating comprised of a double salt metal-lanthanum sulfate onto each crystal.

A humidity-stabilizing coating comprised of NaLa($SO_4$)$_2$ can be obtained by treating, for example, activated lanthanum oxybromide crystals with an aqueous, weakly acidified solution containing about 3 to 5% by weight of dissolved sodium hydrogen sulfate therein.

A coating comprised of $Na_3La(SO_4)_3$ can be obtained by treating, for example, activated lanthanum oxybromide crystals with an aqueous, weakly acidified solution containing about 30 to 50% by weight of dissolved sodium hydrogen sulfate therein.

A coating comprised of $AlLa(SO_4)_2$ can be obtained by treating, for example, activated lanthanum oxybromide crystals with an aqueous, weakly acidified solution containing about 3 to 5% by weight of dissolved aluminum sulfate or ammonium aluminum sulfate or mixtures thereof.

By utilizing the above-described methods of producing a humidity-resistant coating, an extremely dense monomolecular coating is attained because the chemical reaction is terminated after separation of the coated luminescent materials from a select aqueous solution. As a rule, such coating thickness is sufficient to afford adequate protection against ambient or atmospheric humidity because such coating is relatively dense or impervious at its outer surface. As aging tests have shown, such coating does not have to be thicker, although if desired, thicker coatings can be produced. Even hour-long boiling of the inventive humidity-stabilized luminescent materials in water was unable to damage the luminescence intensity of such materials.

Figure 2:
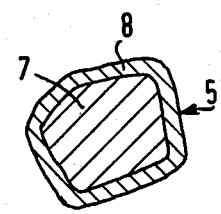
FIG. 2 is an enlarged, cross-sectional view of a humidity-stabilized luminescent material crystal attained in accordance with the principles of the invention.

Referring now to FIG. 1, an x-ray intensifier foil is illustrated as being comprised of a substrate 1 having a reflective film 2 on a surface thereof, which in turn supports the actual luminescent coating 3. This arrangement is overcoated with a protective film 4. The luminescent coating 3 is comprised of humidity-stabilized luminescent material particles 5 dispersed in a compatible bonding agent 6. The actual luminescent material particles 5, as shown in FIG. 2, are comprised of an actual luminescent material crystal 7 having a humidity-stabilizing coating 8 thereon.

In an exemplary embodiment of an x-ray intensifier foil of the type illustrated at FIG. 1, substrate 1 is a 250 μm-thick film of a polyester material. The reflective film 2 is composed of titanium dioxide. The luminescent material particles 5 are dispersed in an acrylic resin, which functions as a compatible bonding agent. The luminescent coating or layer 3 is applied in a select thickness from a lacquer mixture obtained from an admixture of about 1000 ml of a compatible solvent such as glycol ether acetate, about 200 g of a compatible bonding agent, such as an acrylic resin and about 1000 g of a select luminescent material, for example comprised of crystals having a composition of (La, Pb, Na) O Br:Tb:Eu, which are completely coated with insoluble lanthanum compound selected from the group consisting of aluminum-lanthanum sulfate, sodium-lanthanum sulfates and mixtures thereof.

Figure 3:
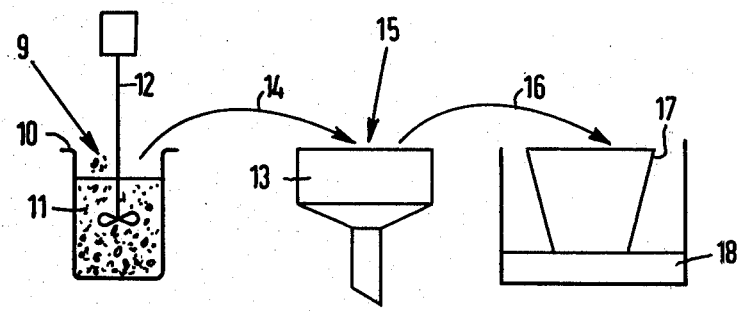
FIG. 3 is a somewhat schematic view of a plurality of processing steps useful in producing the humidity-stabilized luminescent materials of the invention.

FIG. 3 schematically illustrates production steps useful in producing the luminescent material particles 5 of the invention. As a first step, select luminescent crystals, for example of the activated rare-earth oxybromide type, ie., (La, Pb, Na) O Br:Tb:Eu, are weighed out and added into a container 10, as is schematically indicated by arrow 9. Container 10 is provided with an acidified aqueous sulfate solution 11 and is provided with a stirring means 12. The amount of added luminescent crystals is controlled to such an extent that the added particles are able to remain suspended within the solution during agitation thereof so that all surface areas of each crystal are in contact with the solution. The resultant crystal-solution mixture is then thoroughly stirred for a length of time, for example about ten minutes, and thereafter the entire admixture comprised of coated luminescent material particles and spent sulfate solution is transferred into a funnel means 13, as is schematically indicated by arrow 14. After the spent aqueous solution is drained-off, the remaining particles are repeatedly washed, for example with water, as schematically indicated by arrow 15. Thereafter, the relatively clean, coated luminescent crystals are transferred to a crucible 17, as schematically indicated by arrow 16 and dried in an oven means 18 at about 110° C. for about 12 hours. Thereafter, the humidity-stabilized luminescent crystals can be stored until desired or admixed with suitable bonding agents and formed into a luminescent layer in an X-ray intensifier foil or other structure.

The foregoing is considered as illustrative only of the principles of the invention. Further, while there has been shown and described what are at present considered the preferred embodiments of the invention, it will be obvious to those skilled in the art that various changes and modifications may be made therein without departing from the spirit or scope of the invention as defined by the appended claims.

I claim as my invention:

1. In an x-ray intensifier foil comprised of a substrate, a reflective layer on a surface of said substrate, a luminescent layer on said reflective layer and a protective layer at least on said luminescent layer, the improvement comprising wherein:

said luminescent layer is comprised of humidity-stabilized activated rare-earth oxybromide crystals, each coated with a layer comprised of a double salt selected from a group consisting of:

$M^I$La($SO_4$)$_2$; $M^I_3$La($SO_4$)$_3$; $M^{III}$La($SO_4$)$_3$ and mixtures thereof, wherein $M^I$ is an alkali-metal and $M^{III}$ is an earth metal, and a compatible bonding agent.

2. In an x-ray intensifier foil as defined in claim 1 wherein $M^I$ is sodium and $M^{III}$ is aluminum.

3. In an x-ray intensifier foil as defined in claim 1 wherein said double salt is selected from the group consisting of NaLa($SO_4$)$_2$; $Na_3$La($SO_4$)$_3$; AlLa($SO_4$)$_3$ and mixtures thereof.

* * * * *